US009749608B2

(12) United States Patent
Ahn et al.

(10) Patent No.: US 9,749,608 B2
(45) Date of Patent: Aug. 29, 2017

(54) APPARATUS AND METHOD FOR GENERATING A THREE-DIMENSION IMAGE DATA IN PORTABLE TERMINAL

(75) Inventors: Sang-Jun Ahn, Seoul (KR); Kwang-Cheol Choi, Gwacheon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 450 days.

(21) Appl. No.: 13/188,277

(22) Filed: Jul. 21, 2011

(65) Prior Publication Data

US 2012/0019617 A1     Jan. 26, 2012

(30) Foreign Application Priority Data

Jul. 23, 2010 (KR) .................. 10-2010-0071189

(51) Int. Cl.
*H04N 13/00* (2006.01)

(52) U.S. Cl.
CPC .................. *H04N 13/0048* (2013.01)

(58) Field of Classification Search
CPC ........ H04N 13/02; H04N 13/04; H04N 13/00; H04N 13/0048
USPC .......................................................... 348/43
See application file for complete search history.

(56) References Cited

U.S. PATENT DOCUMENTS

| | | | | |
|---|---|---|---|---|
| 5,193,000 A | * | 3/1993 | Lipton | H04N 19/597 348/385.1 |
| 5,801,760 A | * | 9/1998 | Uomori | H04N 13/0014 348/47 |
| 6,144,701 A | * | 11/2000 | Chiang | G06T 9/004 348/43 |
| 6,930,704 B1 | * | 8/2005 | Hamada | H04N 13/0253 348/42 |
| 7,319,720 B2 | * | 1/2008 | Abrams, Jr. | H04N 13/0037 348/E13.014 |
| 7,852,399 B2 | * | 12/2010 | Tamura | H04N 13/0217 348/211.9 |
| 8,023,560 B2 | * | 9/2011 | Yun | H04N 13/0003 375/240.01 |
| 8,130,836 B2 | * | 3/2012 | Ha | H04N 13/0011 348/42 |
| 8,150,238 B2 | * | 4/2012 | Sasaki | G11B 20/1217 345/441 |

(Continued)

FOREIGN PATENT DOCUMENTS

| | | |
|---|---|---|
| KR | 2007-0006228 | 1/2007 |
| KR | 2008-0050953 | 6/2008 |

OTHER PUBLICATIONS

Notice of Preliminary Rejection issued for KR 10-2010-0071189 dated Jan. 21, 2016, 10 pgs.

*Primary Examiner* — Jay Patel
*Assistant Examiner* — Irfan Habib (57) ABSTRACT

An apparatus and a method process a stereoscopic image. More particularly, an apparatus and a method improve compression performance of stereoscopic image data in a portable terminal. The apparatus includes a camera unit including at least two camera modules spaced about a certain distance apart. The camera unit is configured to obtain a first image and a second image to be used to constitute stereoscopic image data. The apparatus further includes a three-dimensional (3D) data generation unit configured to change a compression ratio of the first image and the second image obtained by the camera unit.

18 Claims, 5 Drawing Sheets

(56) References Cited

U.S. PATENT DOCUMENTS

| | | | | |
|---|---|---|---|---|
| 8,284,294 | B2* | 10/2012 | Kohama | H04N 5/2258 348/262 |
| 8,300,089 | B2* | 10/2012 | Robinson | G06T 15/20 348/43 |
| 8,319,938 | B2* | 11/2012 | Pace | G03B 19/22 348/47 |
| 8,326,023 | B2* | 12/2012 | Sawachi | H04N 13/0022 348/139 |
| 8,508,579 | B2* | 8/2013 | Lee | H04N 13/0048 348/36 |
| 8,577,128 | B2* | 11/2013 | Mashitani | H04N 13/0296 348/42 |
| 8,619,148 | B1* | 12/2013 | Watts | G06T 5/006 348/218.1 |
| 8,705,885 | B2* | 4/2014 | Lim, II | H04N 13/0007 375/240.29 |
| 8,810,628 | B2* | 8/2014 | Suzuki | H04N 13/0048 348/139 |
| 8,941,721 | B2* | 1/2015 | Kim | H04N 1/00307 348/207.11 |
| 9,106,894 | B1* | 8/2015 | Kvaalen | H04N 13/0048 |
| 9,426,445 | B2* | 8/2016 | Lu | H04N 13/0033 |
| 2002/0009137 | A1* | 1/2002 | Nelson | H04N 7/01 375/240.1 |
| 2002/0063807 | A1* | 5/2002 | Margulis | G06T 1/20 348/745 |
| 2003/0043905 | A1* | 3/2003 | Nakayama | H04N 1/411 375/240.04 |
| 2004/0120396 | A1* | 6/2004 | Yun | H04N 13/004 375/240.01 |
| 2005/0207486 | A1* | 9/2005 | Lee | H04N 13/0239 375/240.01 |
| 2005/0238243 | A1* | 10/2005 | Kondo | H04N 19/176 382/239 |
| 2006/0140487 | A1* | 6/2006 | Tabata | H04N 1/642 382/232 |
| 2007/0031062 | A1* | 2/2007 | Pal | G06F 17/30843 382/284 |
| 2007/0035619 | A1* | 2/2007 | Yoon | G03B 35/20 348/47 |
| 2007/0183676 | A1* | 8/2007 | Hannuksela | H04N 19/174 382/243 |
| 2008/0131107 | A1* | 6/2008 | Ueno | G03B 17/00 396/50 |
| 2008/0198920 | A1* | 8/2008 | Yang | H04N 13/0018 375/240.01 |
| 2008/0252719 | A1* | 10/2008 | Choi | H04N 5/772 348/43 |
| 2009/0066785 | A1* | 3/2009 | Lee | H04N 13/0048 348/51 |
| 2009/0190662 | A1* | 7/2009 | Park | H04N 19/597 375/240.16 |
| 2010/0046607 | A1* | 2/2010 | Tseng | H04N 19/172 375/240.01 |
| 2010/0085423 | A1* | 4/2010 | Lange | G02B 27/22 348/46 |
| 2010/0091354 | A1* | 4/2010 | Nam | G02B 27/2214 359/298 |
| 2010/0135386 | A1* | 6/2010 | Shibata | H04N 19/176 375/240.03 |
| 2010/0189182 | A1* | 7/2010 | Hannuksela | H04N 21/234327 375/240.25 |
| 2010/0260268 | A1* | 10/2010 | Cowan | H04N 13/0048 375/240.25 |
| 2010/0265317 | A1* | 10/2010 | Tomizawa | G03B 17/38 348/46 |
| 2011/0052140 | A1* | 3/2011 | Mori | H04N 5/772 386/224 |
| 2011/0063419 | A1* | 3/2011 | Lee | H04N 13/0239 348/47 |
| 2011/0149051 | A1* | 6/2011 | Jang | H04N 13/0452 348/51 |
| 2011/0149086 | A1* | 6/2011 | Winbush, III | H04N 5/232 348/207.1 |
| 2012/0062698 | A1* | 3/2012 | Lee | H04N 13/0059 348/43 |
| 2012/0131005 | A1* | 5/2012 | Shen | G06F 17/30256 707/737 |
| 2012/0274741 | A1* | 11/2012 | Lee | H04N 13/0048 348/43 |
| 2012/0300051 | A1* | 11/2012 | Daigo | H04N 5/2258 348/77 |
| 2013/0021508 | A1* | 1/2013 | Uranishi | H01L 27/14818 348/294 |
| 2013/0235159 | A1* | 9/2013 | Kim | H04N 21/234327 348/43 |

* cited by examiner

APPARATUS AND METHOD FOR GENERATING A THREE-DIMENSION IMAGE DATA IN PORTABLE TERMINAL

CROSS-REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on Jul. 23, 2010, and assigned Serial No. 10-2010-0071189, the entire disclosure of which is hereby incorporated by reference.

TECHNICAL FIELD OF THE INVENTION

The present invention relates generally to an apparatus and a method for processing a stereoscopic image. More particularly, the present invention relates to an apparatus and a method for improving compression performance of stereoscopic image data in a portable terminal.

BACKGROUND OF THE INVENTION

Recent image technologies are researching methods for realizing a three-dimensional (3D) image in order to represent more realistic image information. Using human visual characteristics, a method for projecting a left-view image and a right-view image to corresponding locations in a conventional display apparatus, producing an image by dividing the left view and the right view to a left eye and a right eye of a user, and thus providing 3D effect is acknowledged with its possibility in several aspects. For example, a portable terminal, such as stereoscopic mobile phone, a stereoscopic camera, and a stereoscopic camcorder, including a barrier Liquid Crystal Display (LCD) and a 3D TV can play stereoscopic contents and provide more realistic images to the user.

With a stereovision technique, the portable terminal obtains a stereoscopic image for the user by combining two images captured by two camera modules, and compresses the stereoscopic image mostly using a simulcast scheme, a compatible scheme, and a joint scheme.

Using the simulcast scheme, the portable terminal separates and encodes a first image and a second image forming the stereoscopic image.

Using the compatible scheme, the portable terminal encodes the first image of the stereoscopic image with a two-dimensional image compression technique. Next, the portable terminal encodes the second image of the stereoscopic image only with the correlation of the first image. As such, since the characteristics between the two images are not considered, compression performance is degraded and computation complexity is doubled.

The compatible scheme encodes the first image with a general codec and encodes the second image merely based on the correlation of the first image, and accordingly, it is difficult to determine the correlation between the two images.

Lastly, the joint scheme, which combines the simulcast scheme and the compatible scheme, encodes the first image of the stereoscopic image using the two-dimensional image compression technique. Next, the portable terminal encodes the second image using the first image according to the image characteristics of the second image of the stereoscopic image, or encodes the second image using the two-dimensional image compression technique separately from the first image. While the compression efficiency rises, the computational complexity is higher than the simulcast scheme.

SUMMARY OF THE INVENTION

To address the above-discussed deficiencies of the prior art, it is an aspect of the present disclosure to provide an apparatus and a method for improving compression performance of three-dimensional data in a portable terminal.

Another aspect of the present disclosure is to provide an apparatus and a method for lowering complexity in three-dimensional data compression by changing a compression ratio of a first image and a second image in a portable terminal.

Another aspect of the present disclosure is to provide an apparatus and a method for compressing an image by lowering an image quality of any one of images constituting three-dimensional data in a portable terminal.

Yet another aspect of the present disclosure is to provide an apparatus and a method for generating data by uniting a plurality of images of which a compression ratio is changed in a portable terminal.

In accordance with an aspect of the present disclosure, an apparatus for generating stereoscopic image data is provided. The apparatus includes a camera unit including at least two camera modules spaced a certain distance apart. The camera unit is configured to obtain a first image and a second image to be used to constitute stereoscopic image data; and a three-dimensional (3D) data generation unit for changing a compression ratio of the first image and the second image obtained by the camera unit.

In accordance with another aspect of the present disclosure, a method for generating stereoscopic image data is provided. The method includes obtaining a first image and a second image to be used to constitute stereoscopic image data through at least two camera modules spaced a certain distance apart; and changing a compression ratio of the first image and the second image obtained.

In accordance with another aspect of the present disclosure, an apparatus for generating stereoscopic image data is provided. The apparatus includes a camera unit including at least two camera modules spaced a certain distance apart. The camera unit is configured to obtain a first image and a second image to be used to constitute stereoscopic image data. The apparatus further includes a condition setter configured to determine a compression ratio of the first image and the second image. The apparatus further includes a first encoder configured to compress the first image and a second encoder configured to compress the second image. The apparatus further includes a 3D data generation unit configured to generate 3D data including the first image and the second image compressed by the first encoder and the second encoder.

In accordance with another aspect of the present disclosure, an apparatus for playing stereoscopic image data is provided. The apparatus includes a controller configured to determine whether data to play includes a plurality of data compressed at different compression ratios and control to selectively play data of the plurality of data. The controller processes to select and play any one of the plurality of the data when the portable terminal does not support 3D data and provides stereoscopic effect by playing the plurality of the data when the portable terminal supports the 3D data.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain exemplary embodiments of the present disclosure will be more apparent from the following description taken in conjunction with the accompanying drawings, in which.

Throughout the drawings, like reference numerals will be understood to refer to like parts, components and structures.

DETAILED DESCRIPTION OF THE INVENTION

FIGS. 1 through 5, discussed below, and the various embodiments used to describe the principles of the present disclosure in this patent document are by way of illustration only and should not be construed in any way to limit the scope of the disclosure.

Embodiments of the present disclosure provide an apparatus and a method for lowering complexity in compression of three-dimensional (3D) data by changing a compression ratio of a first image and a second image and compressing the images in a portable terminal. The portable terminal encompasses multimedia devices capable of playing stereoscopic contents, such as stereoscopic mobile phone, stereoscopic camera, stereoscopic camcorder, and 3D TV.

Figure 1:
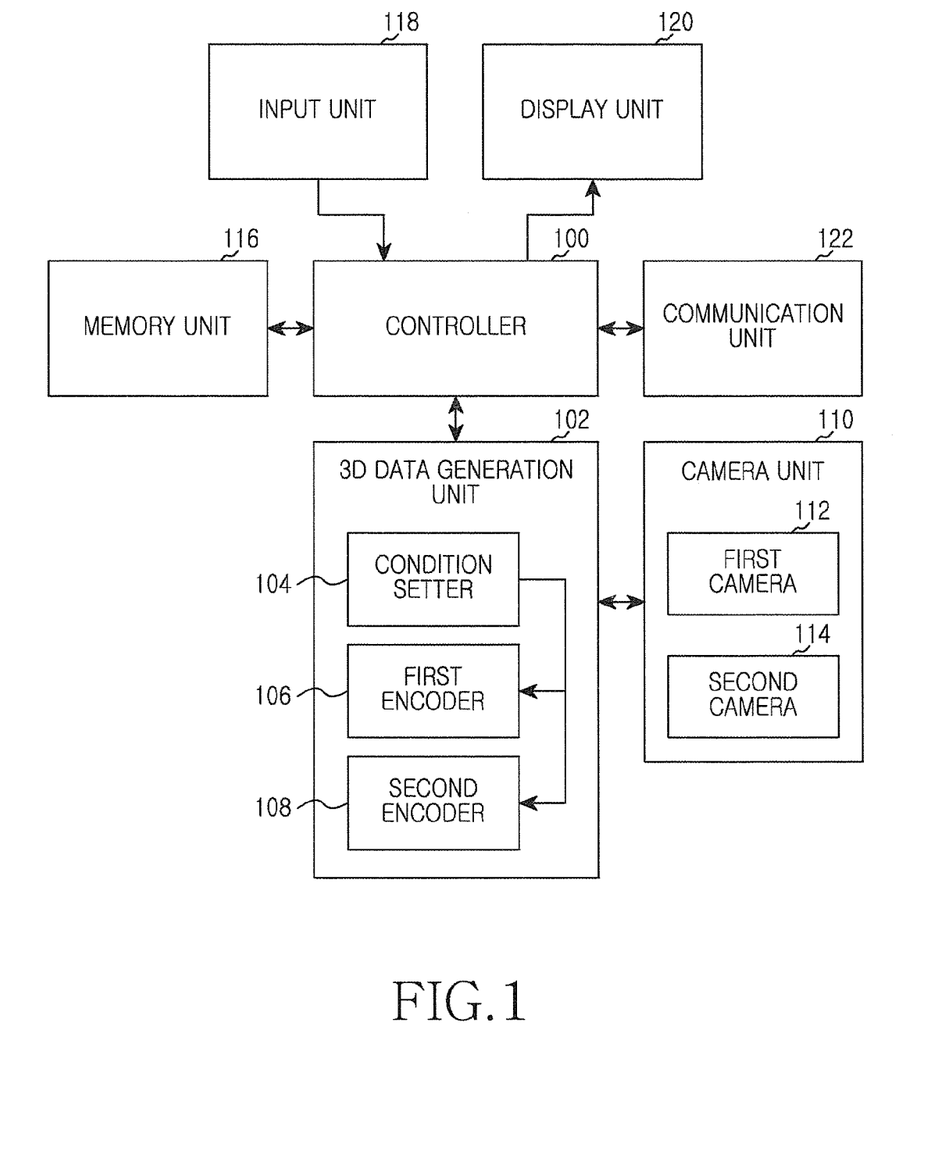
FIG. 1 illustrates a portable terminal for enhancing compression performance of stereoscopic image data according to an embodiment of the present disclosure.

FIG. 1 illustrates a portable terminal for enhancing compression performance of stereoscopic image data according to an illustrative embodiment of the present disclosure.

As shown in FIG. 1, the portable terminal includes a controller 100, a 3D data generation unit 102, a camera unit 110, a memory unit 116, an input unit 118, a display unit 120, and a communication unit 122.

The 3D data generation unit 102 can include a condition setter 104, a first encoder 106, and a second encoder 108. The camera unit 110 can include a first camera 112 and a second camera 114.

The controller 100 controls operations of the portable terminal. For example, the controller 100 processes and controls voice communication and data communication. In addition to those typical functions, the controller 100 controls the 3D data generation unit 102 to generate stereoscopic image data. In so doing, before compressing a first image and a second image constituting the stereoscopic image data, the controller 100 changes a compression condition (e.g., a coding variable (motion vector search range, bit rate, error correction, intra prediction, and etc.) for changing the type of the encoder) of the first image and the second image and thus enhances compression performance.

Generally, the first image and the second image captured in the same time zone contain similar image information, and people obtain the 3D effect by viewing the united images. Hence, the controller 100 changes the compression condition of the first image and the second image based on the fact that the 3D effect does not decline even when the image quality of either the first image or the second image is poor.

The controller 100 processes to generate the first image and the second image compressed by changing the compression condition as above, as data of one file. This changing of the compression condition is to allow even a 2D terminal not supporting the stereoscopic image data to play the stereoscopic image data including the compressed image as above. That is, when the portable terminal supports the stereoscopic image data, the portable terminal plays the stereoscopic image data combining the image without changing the compression ratio and the image with the changed compression ratio. By contrast, when the portable terminal does not support the stereoscopic image data, the portable terminal plays only the data without changing the compression ratio in the stereoscopic image data.

The 3D data generation unit 102 processes to change the compression ratio of the first image and the second image under control of the controller 100.

The condition setter 104 sets the compression ratio of the first image and the second image under control of the 3D data generation unit 102. More specifically, the condition setter 104 provides the first encoder 106 with the compression ratio of the image playable even by the 2D portable terminal to compress the first image, and provides the second encoder 108 with the compression ratio for the image of the low image quality to compress the second image. In so doing, the condition setter 104 sets the compression ratio for the image by modifying the coding variable (motion vector search range, bit rate, error correction, and intra prediction).

As such, the compressed images are captured at the same time. The image quality of the stereoscopic image data generated with the first image and the second image does not degrade even when the image quality of the second image is low.

The first encoder 106 compresses the first image at the compression ratio defined by the condition setter 104, and the second encoder 108 compresses the second image at the compression ratio defined by the condition setter 104.

The images compressed by the first encoder 106 and the second encoder 108 are united by the 3D data generation unit 102 into a single file.

The camera unit 110 can include the first camera 112 and the second camera 114. The camera unit 110 spaces the first camera 112 and the second camera 114 about a certain distance and captures an object similarly to the image viewed by both eyes of the human.

The memory unit 116 preferably includes, for example, a Read Only Memory (ROM), a Random Access Memory (RAM), a flash ROM, and such. The ROM stores microcodes and reference data of a program for processing and controlling of the controller 100 and the 3D data generation unit 102.

The RAM, which is a working memory of the controller 100, stores temporary data generated during the program execution. The flash ROM contains updatable data such as a phonebook, outgoing messages, incoming messages, and such. In an embodiment of the present disclosure, the flash ROM contains the stereoscopic image data generated by the 3D data generation unit 102. The memory unit 116 stores the first image captured by the first camera 112 and the second image captured by the second camera 114 to an image information region under the control of the controller 100.

The input unit 118 includes a plurality of function keys such as number keys 0~9, a menu key, a cancel key, an OK key, a call key, an end key, an Internet access key, navigation keys (direction keys), character input keys, and the like. The input unit 118 provides the controller 100 with key input data corresponding to the key pressed by the user.

The display unit 120 displays status information, a limited number of characters, videos, and still images during the operation of the portable terminal. The display unit 120 can employ a color Liquid Crystal Display (LCD), Active Mode Organic Light Emitting Diode (AMOLED), and such. When the display unit 120 includes a touch input device and is applied to a touch-type portable terminal, the display unit 120 can be used as the input device.

The communication unit 122 processes to transmit and receive radio signals of input and output data via an antenna (not illustrated). For instance, in the transmission, the communication unit 122 channel-encodes, spreads, Radio Frequency (RF)-processes, and transmits data. In the reception, the communication unit 122 converts the received RF signal into a baseband signal and restores the data by de-spreading and channel-decoding the baseband signal.

While the controller 100 of the portable terminal can serve as the 3D data generation unit 102, the controller 100 and the 3D data generation unit 102 are separately illustrated here to distinguish various exemplary functions of the present invention, not to limit the scope of the invention. One skilled in the art should understand that various modifications can be made without departing from the spirit and scope of the invention. For example, the controller 100 can process all of the functions of the 3D data generation unit 102.

Figure 2:
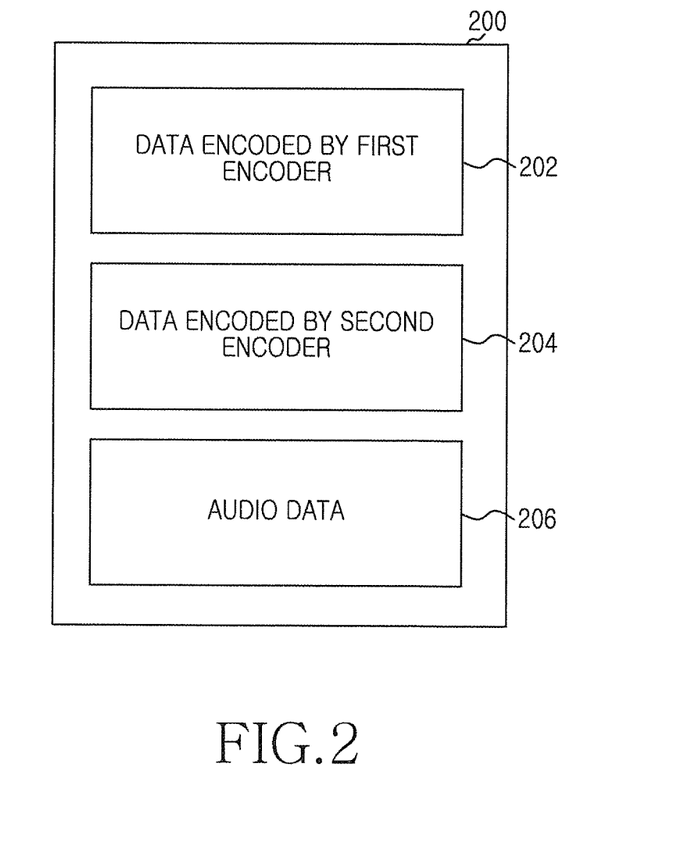
FIG. 2 illustrates a structure of the stereoscopic image data generated as an image with a compression ratio changed according to an embodiment of the present disclosure.

FIG. 2 depicts a structure of the stereoscopic image data generated as the image with the compression ratio changed according to an embodiment of the present disclosure.

Referring to FIG. 2, the stereoscopic image data 200 can include the first image 202 which is the data encoded by the first encoder 106, the second image 204 which is the data encoded by the second encoder 108, and audio data 206.

Herein, the first image 202 can be the image compressed at the general compression ratio, and the second image 204 can be the image compressed at the compression ratio for the low image quality so as to improve the compression performance.

When the first image 202 and the second image 204 are combined and reproduced, the portable terminal plays the stereoscopic image data offering the 3D effect. When either the first image 202 or the second image 204 is reproduced, the portable terminal plays the general image, not the stereoscopic image.

The data encoded by the two encoders are separated in order to support the stereoscopic image data 200 even in the general 2D portable terminal incapable of playing the 3D data.

When the first image 202 and the second image 204 are stored without separating them, the 2D portable terminal cannot play the stereoscopic image data 200. Using the stereoscopic image data of the present disclosure, the 2D portable terminal can play only the image of the good image quality among the first image 202 and the second image 204.

Figure 3:
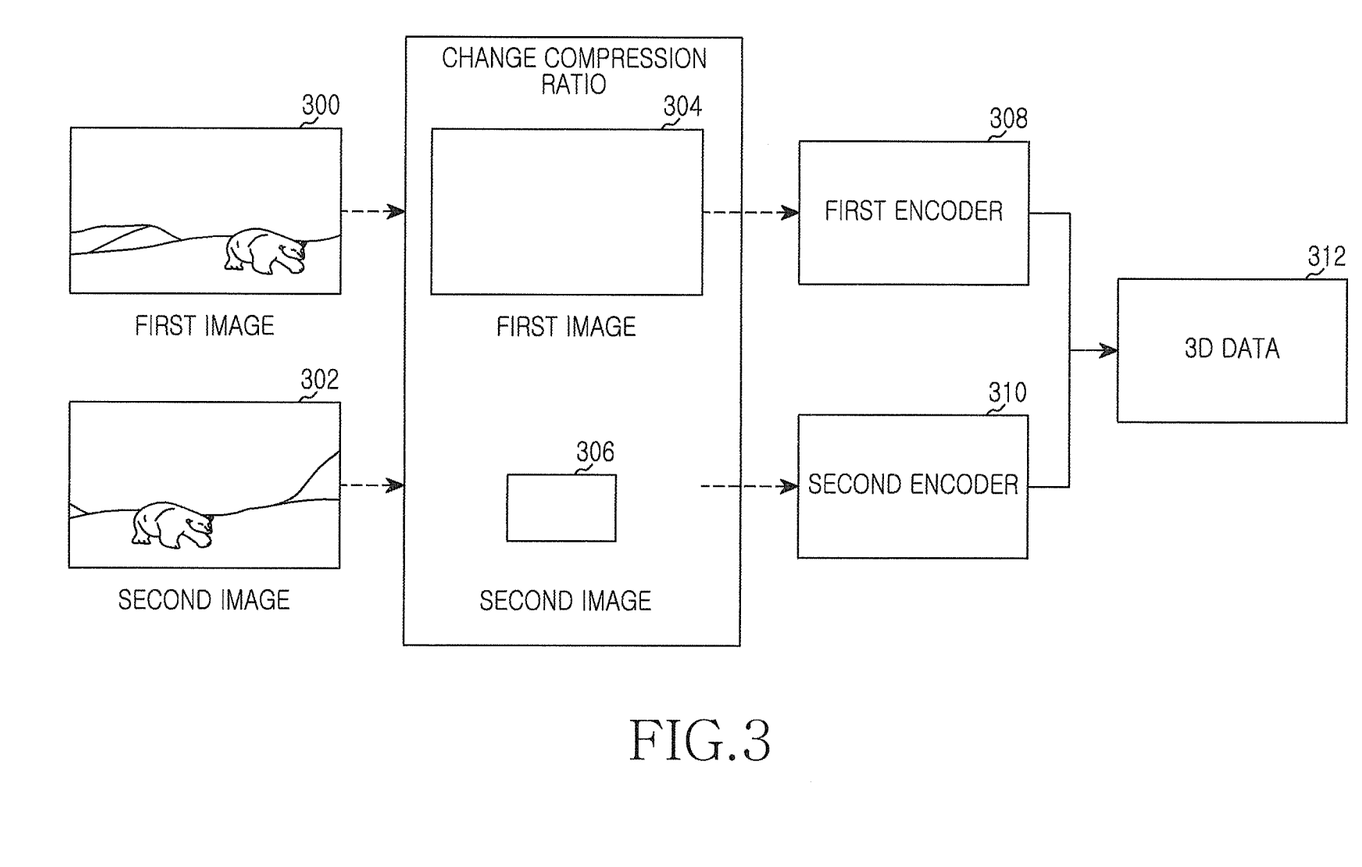
FIG. 3 illustrates a process for generating the stereoscopic image data in the portable terminal according to an embodiment of the present disclosure.

FIG. 3 illustrates a process for generating the stereoscopic image data in the portable terminal according to an embodiment of the present disclosure.

Referring to FIG. 3, the portable terminal obtains the first image 300 through the first camera and the second image 302 through the second camera.

Herein, the first image 300 and the second image 302, which are the images of the same object, are captured by the cameras spaced apart similarly to the images viewed by both eyes of the human.

Upon obtaining the images, the portable terminal lowers the image quality of either the first image 300 or the second image 302 so as to enhance the compression performance. This enhancement of the compression performance is based on the fact that the image quality of the stereoscopic image data generated with the first image 300 and the second image 302 does not degrade even when the image quality of any one of the two images captured at the same time is low.

When compressing the first image 304 at the general compression ratio and the second image 306 at the compression ratio set to lower the image quality, the portable terminal sends the preset compression ratio to the first encoder 308 and the second encoder 310 as shown in FIG. 3.

The first encoder 308 and the second encoder 310 receive the compression ratio, compress the first image 300 and the second image 302 at the corresponding compression ratio. The portable terminal generates stereoscopic image data (3D data) 312 by uniting the compressed data into the single file.

Figure 4:
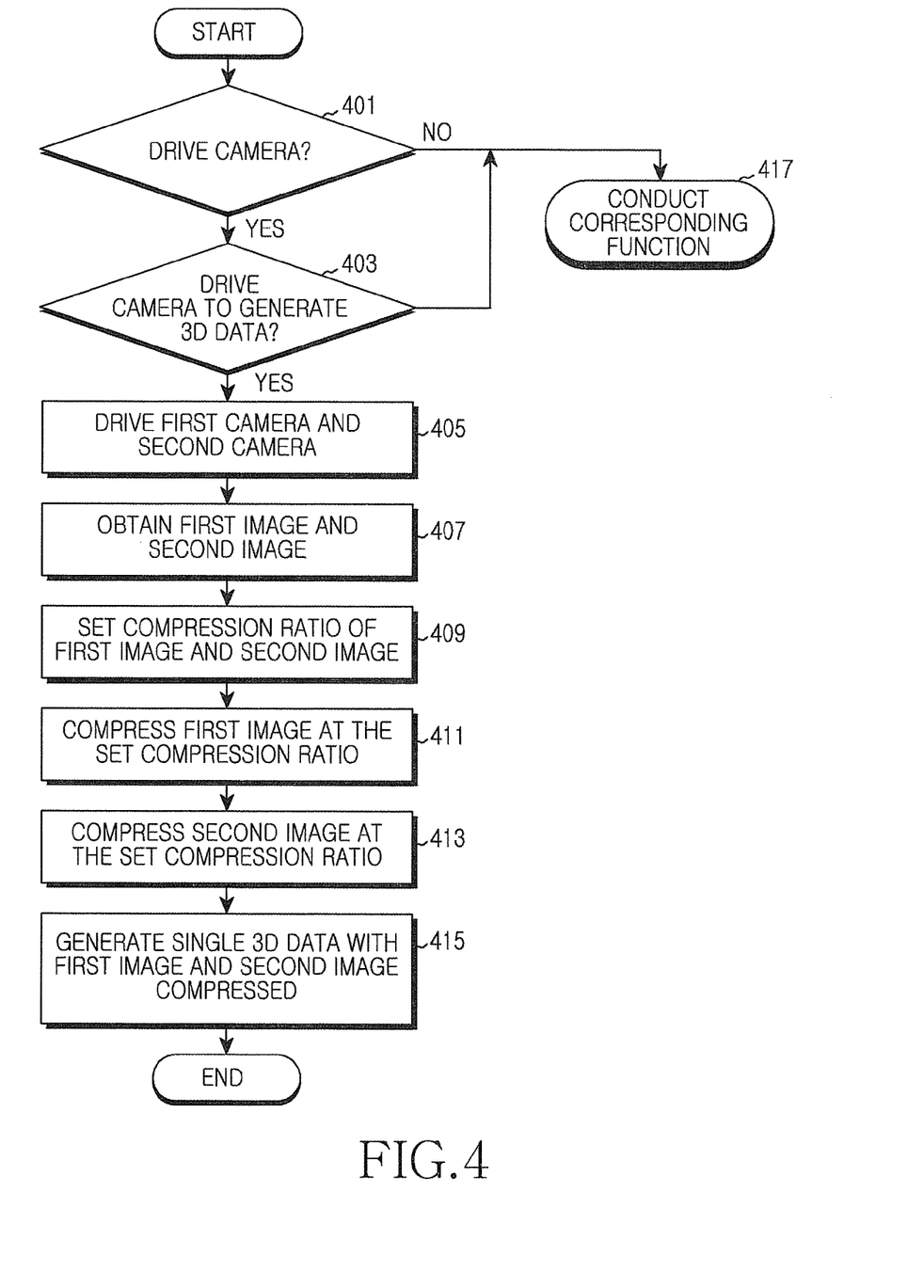
FIG. 4 illustrates a process for generating the stereoscopic image data in the portable terminal according to an embodiment of the present disclosure.

FIG. 4 illustrates a process for generating the stereoscopic image data in the portable terminal according to an embodiment of the present disclosure.

Referring to FIG. 4, the portable terminal determines whether the camera is driven in step 401. For example, the portable terminal determines whether a camera mode is executed by a user's manipulation or the program and the camera is driven.

When the camera is not driven in step 401, the portable terminal executes a corresponding function (e.g., a standby mode) in step 417.

When the camera is driven in step 401, the portable terminal determines whether the camera is driven to generate the 3D data in step 403.

When the camera is not driven to generate the 3D data in step 403, the portable terminal goes to step 417.

By contrast, when the camera is driven to generate the 3D data in step 403, the portable terminal drives the first camera and the second camera in step 405 and controls to obtain the first image through the first camera and the second image through the second camera in step 407.

In step 409, the portable terminal processes to set the compression ratio of the first image and the second image.

Herein, the compression ratio of the first image and the second image are the compression ratio for lowering the image quality of either image in order to improve the compression performance of the stereoscopic image data of the portable terminal.

In detail, the portable terminal can compress the first image at the general compression ratio, compress the second image by lowering the compression ratio and the image quality, and then generate the stereoscopic image data by combining the two images. This generation of stereoscopic image data is based on the fact that the image quality of the stereoscopic image data is not degraded even when the compression ratio of the second image is lowered. By lowering the compression ratio of the second image, the complexity in compressing the stereoscopic image data can be reduced.

The portable terminal, upon setting the compression ratio of the first image and the second image, compresses the first image at the compression ratio set for the first image in step 411, and compresses the second image at the compression ratio set for the second image in step 413.

In step 415, the portable terminal generates the 3D data by uniting the compressed first image and second image into the single file.

The 3D data is the stereoscopic image data supported by the 2D portable terminal and the 3D portable terminal, and includes the first image encoded by the first encoder, the second image encoded by the second encoder, and audio data.

Hence, when the 2D portable terminal is to play the 3D data, either the first image or the second image is reproduced. When the 3D portable terminal is to play the 3D data, the first image and the second image are united and reproduced.

Next, the portable terminal finishes this process.

Figure 5:
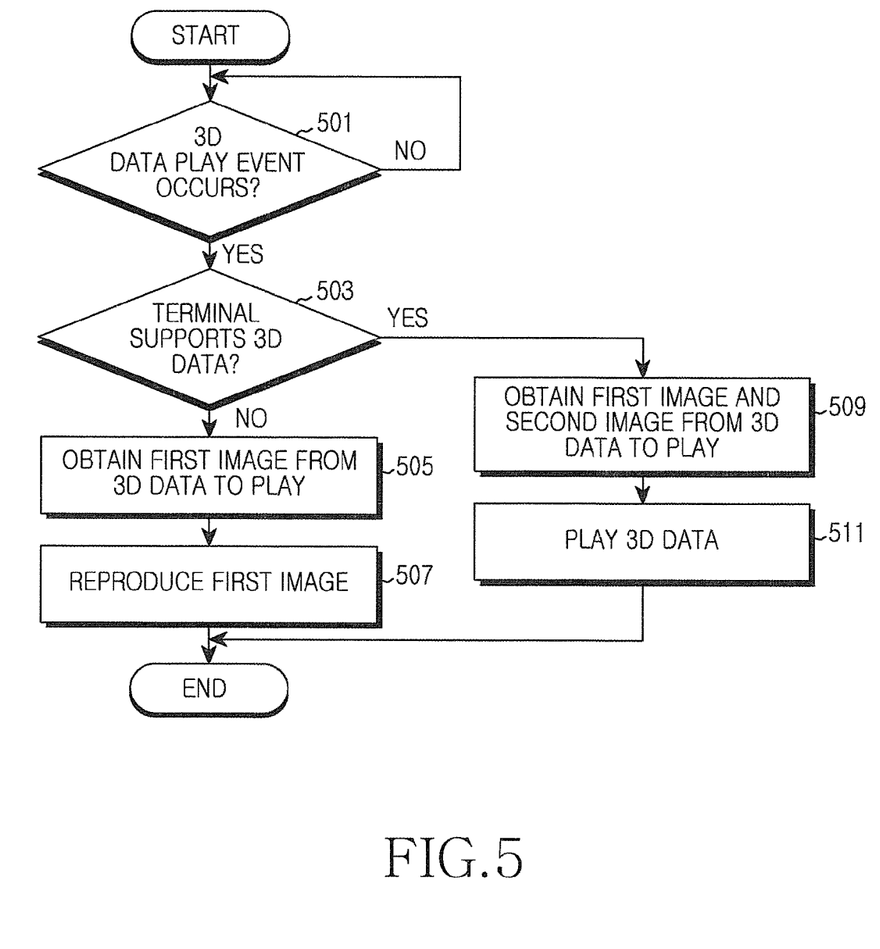
FIG. 5 illustrates a process for playing the stereoscopic image data in the portable terminal according to an embodiment of the present disclosure.

FIG. 5 illustrates a process for playing the stereoscopic image data in the portable terminal according to an embodiment of the present disclosure.

Referring to FIG. 5, the portable terminal determines whether a stereoscopic image data play event for providing the 3D effect occurs in step 501. Herein, the stereoscopic image data indicates data including the first image and the second image obtained through two cameras spaced about a certain distance apart to capture the same object. To enhance the compression performance of the portable terminal, at least one of the first image and the second image is compressed into the low image quality.

When the stereoscopic image data play event does not take place in step 501, the portable terminal repeats step 501.

By contrast, when the stereoscopic image data play event occurs in step 501, the portable terminal determines whether the portable terminal to play the stereoscopic image data supports the 3D data in step 503.

When the portable terminal does not support the 3D data in step 503, the portable terminal obtains the first image from the stereoscopic image data to play in step 505 and reproduces the obtained first image in step 507.

Herein, the first image is the image compressed at the normal compression ratio, not the image compressed into the low image quality.

By contrast, when the portable terminal supports the 3D data in step 503, the portable terminal obtains the first image and the second image from the stereoscopic image data to play in step 509, and plays the stereoscopic image data by combining and reproducing the obtained first image and second image in step 511.

Herein, the images are captured at the same time and have the same characteristics. While at least one of the images is compressed into the low image quality, the stereoscopic image effect is not degraded when the images are combined and output in the screen.

Next, the portable terminal finishes this process.

While the apparatus and the method for enhancing the compression performance with two images have been illustrated so far, the present disclosure can use three or more images. When three or more images are used, the stereoscopic image data of the present disclosure is data uniting the first image, the second image, and the third image.

As set forth above, the portable terminal compresses the image by changing the coding variable of the codec corresponding to the image constituting the 3D data, to thus enhance the performance compared to the compression method of the stereoscopic image data of the conventional portable terminal.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus to generate stereoscopic image data, the apparatus comprising: a camera unit including a first camera module and a second camera module spaced a distance apart, wherein the camera unit is configured to: obtain a first image and a second image for an object at different angles, and store the first image and the second image as separate files; and a controller configured to: control the camera unit to obtain the first image by the first camera module and the second image by the second camera module in response to detecting a stereoscopic image data generate request, set and provide a compression condition of the first image and the second image to a first encoder and a second encoder; change the second compression ratio for the second image from the first compression ratio for the first image to lower an image quality of the second image; compress, using the first encoder, the first image using a first compression ratio and, using the second encoder, the second image using a second compression ratio different from the first compression ratio, generate the stereoscopic image data comprising the first image and the second image, reproduce one image compressed by a compression ratio associated with a high image quality among the first image and the second image comprised in the stereoscopic image data in response to detecting a two-dimensional (2D) image data play request, and reproduce the first image and the second image comprised in the stereoscopic image data in response to detecting a three-dimensional (3D) image data play request.

2. The apparatus of claim 1, wherein the controller is further configured to generate the stereoscopic image data uniting the first image and the second image into one file.

3. The apparatus of claim 2, wherein the stereoscopic image data uniting the first image and the second image into the one file is reproducible by a 2D portable terminal and a 3D portable terminal.

4. The apparatus of claim 3, wherein the first image of the stereoscopic image data is an image compressed into a predefined image quality.

5. The apparatus of claim 1, wherein the compression condition comprises a coding variable to change a type of the first encoder and the second encoder and comprises at least one of a motion vector search range, a bit rate, error correction, and intra prediction.

6. A method to generate stereoscopic image data, the method comprising: obtaining a first image and a second image for an object at different angles using at least two camera modules spaced a distance apart in response to detecting a stereoscopic image data request; setting and providing a compression condition of the first image and the second image to a first encoder and a second encoder; changing the second compression ratio for the second image from the first compression ratio for the first image to lower an image quality of the second image; compressing using the first encoder, the first image using a first compression ratio and, using the second encoder, the second image using a second compression ratio different from the first compression ratio; reproducing one image compressed by a compression ratio associated with a high image quality among the first image and second image stored as separate files in response to detecting a two-dimensional (2D) image data play request; and reproducing the first image and the second image stored as the separate files in response to detecting a three-dimensional (3D) image data play request.

7. The method of claim 6, further comprising generating the stereoscopic image data uniting the first image and the second image into one file.

8. The method of claim 7, wherein the stereoscopic image data uniting the first image and the second image into the one file is reproducible by a 2D portable terminal and a 3D portable terminal.

9. The method of claim 8, wherein the first image in the stereoscopic image data is an image compressed into a predefined image quality.

10. The method of claim 6, wherein changing the second compression ratio for the second image from the first compression ratio for the first image to lower an image quality of the second image.

11. The method of claim 6, wherein changing the compression ratio of the first image and the second image comprises: setting a compression condition of the first image and the second image; providing the compression condition of the first image to a first encoder; providing the compression condition of the second image to a second encoder; and compressing the first image using the first encoder and the second image using the second encoder.

12. The method of claim 11, wherein the compression condition comprises a coding variable to change a type of the first encoder and the second encoder and comprises at least one of a motion vector search range, a bit rate, an error correction, and an intra prediction.

13. An apparatus to generate stereoscopic image data, the apparatus comprising: a camera unit including at least two camera modules spaced a distance apart, wherein the camera unit is configured to: obtain a first image and a second image to constitute the stereoscopic image data and store the first image and the second image as separate files; a condition setter configured to change a second compression ratio for the second image from a first compression ratio for the first image to lower an image quality of the second image; a first encoder configured to compress the first image using the first compression ratio; a second encoder configured to compress the second image using the second compression ratio; and a controller configured to: set and provide a compression condition of the first image and the second image to a first encoder and a second encoder; change the second compression ratio for the second image from the first compression ratio for the first image to lower an image quality of the second image; reproduce three-dimensional (3D) data by reproducing the first image and the second image, and reproduce two-dimensional (2D) data by reproducing one image compressed by a compression ratio associated with a high image quality among the first image and the second image.

14. The apparatus of claim 13, wherein the controller is further configured to unite the first image and the second image into one file.

15. The apparatus of claim 13, wherein the condition setter is configured to determine a compression ratio of the second image based on a predefined image quality.

16. An apparatus to play stereoscopic image data, the apparatus comprising a controller configured to: determine whether data comprises a first image data and a second image data compressed at different compression ratios, wherein an image quality of some of the second image data is lowered to enhance a compression performance, and wherein the first image data and the second image data are separated into separate files; select and play at least some of the separate files when a portable terminal does not support three-dimensional (3D) image data and provide a stereoscopic effect by playing all of the separate files when the portable terminal supports the 3D image data.

17. The apparatus of claim 16, wherein the controller is configured to play the separate files when the portable terminal supports at least the 3D image data by uniting the separate files into one file.

18. The apparatus of claim 16, wherein the controller is configured to selectively play some of the separate files in response to detecting a two-dimensional (2D) image play request and to selectively play the separate files in response to detecting a three-dimensional (3D) image play request.

* * * * *